Figure 1:
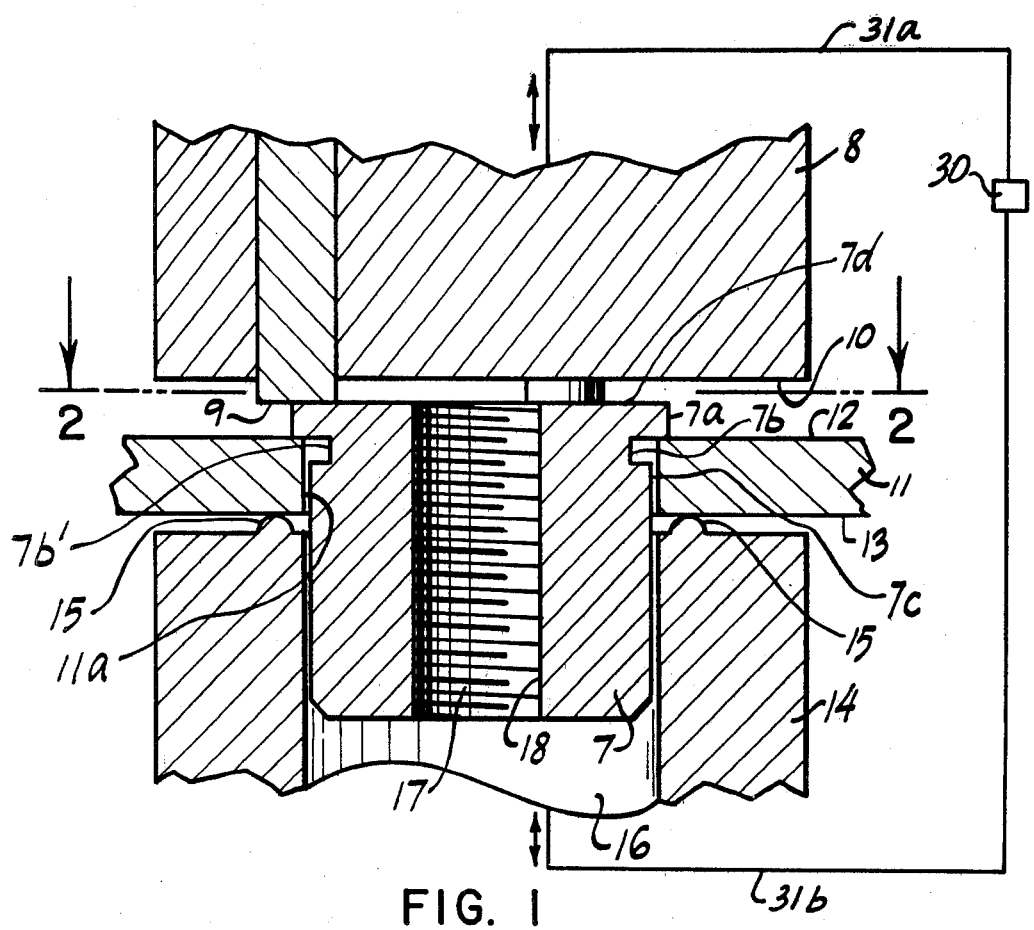

United States Patent [19]

Krueger

[11] Patent Number: 4,468,161

[45] Date of Patent: Aug. 28, 1984

[54] SHEET CARRYING A WELDED NUT

[76] Inventor: Guenther Krueger, 16 Bristol Ct., Berkeley Heights, N.J. 07422

[21] Appl. No.: 238,932

[22] Filed: May 6, 1981

Related U.S. Application Data

[63] Continuation-in-part of Ser. No. 180,666, Aug. 25, 1980, Pat. No. 4,281,786.

[51] Int. Cl.³ .................. F16B 37/06; B23K 20/02
[52] U.S. Cl. ................................. 411/171; 411/181; 29/509; 228/3.1; 228/116
[58] Field of Search ............... 411/38, 171, 176–181; 29/509, 520, 521, 432.1, 432.2; 228/3.1, 115, 116; 10/86 CL, 86 F

[56] References Cited

U.S. PATENT DOCUMENTS

| | | | |
|---|---|---|---|
| 2,703,998 | 3/1955 | Sowter | 228/115 |
| 2,707,507 | 5/1955 | Tripp et al. | 10/86 CL |
| 2,707,821 | 5/1955 | Sowter | 228/115 |
| 2,799,188 | 7/1957 | Newcomb | 29/509 |
| 3,234,987 | 2/1966 | Hentzi | 411/179 |
| 3,399,705 | 9/1966 | Breed et al. | 411/180 |
| 3,443,617 | 5/1969 | Whiteside et al. | 411/181 |
| 3,775,833 | 12/1973 | Grube | 228/116 |
| 3,883,915 | 5/1975 | Steward | 10/86 CL |
| 3,909,913 | 10/1975 | Tildesley | 29/509 |
| 3,948,142 | 4/1976 | McKay et al. | 411/38 |
| 4,095,327 | 6/1978 | Hartmann | 29/509 |

Primary Examiner—Thomas J. Holko
Assistant Examiner—Neill Wilson
Attorney, Agent, or Firm—William T. Hough

[57] ABSTRACT

In a preferred embodiment, a metal nut compacted and welded within the thickness of a metal sheet, within a sheet-aperture of lesser diameter than a top of the nut, spaced-apart compacted edge portions of the nut's top having a larger diameter than the nut's top at other edge locations in the compacted state, and the sheet's malleable metal of bottom portions thereof adjacent the aperture being compacted against and welded to malleable metal of a circumscribing side wall of the nut.

5 Claims, 6 Drawing Figures

SHEET CARRYING A WELDED NUT

This application is a continuation-in-part of parent application U.S. Ser. No. 06/180,666 filed 08/25/80, now U.S. Pat. No. 4,281,786 issued Aug. 4, 1981.

This invention is directed to a novel article produced typically by the method and machine of the above-noted parent application, the article being an improved mounted nut mounted within an aperture of a sheet.

BACKGROUND OF THE INVENTION

Prior to the present invention, nuts have been mounted on metal support plates or sheets by a machine press compacting the nut into an aperture and forcing malleable metal of the sheet into a nut-circumscribing recess located beneath an upper nut edge overhanging and overlapping the adjacent sheet surface next to the aperture. Such method thus resulted in a clamped-in nut-form bradded article which under excessive or repeated normal extraction pressures resulting from objects supported by screws mounted in the nuts, resulted too frequently in the nut being torn from its clamped-in seat within the aperture. Also, to prevent the clamped-in nut from revolving within the aperture seating structure of the sheet, the prior art companies have sometimes serrated a portion of the nut's circumscribing wall-edge so that it binds when the nut is pressed into its seated clamped-in position within the aperture. Another approach to prevent the clamped-in nut from twisting or turning in its seating aperture structure, has been to pre-form the nut to have an upper circumscribing edge of other than circular shape, such as hexagonal so that when the nut is compacted into the aperture, the hexagonally shaped nut-edge is bradded into the malleable metal of the surface of the sheet. While such nuts effectively prevent twisting or turning of the nut in its seated state, they never-the-less still have the low resistance to accidental extraction noted-above. Also of great significance, the manufacturing costs of such specially-shaped nuts is high, with a resulting high sales price for the finished product.

As is typically shown in the U.S. Pat. No. 4,095,327, the prior art presses the nut into a seated state within an aperture within the aperture-forming structure of the aperture. This patent illustrates still another approach for clamping the seated nut into its position by bending-over upper circumscribing aperture edge structure onto the top edge of the seated nut. As shown in this patent, the top of the nut when seated often does not remain extending or protruding above the surface of the metal support plate, but protrudes from the bottom side of the plate or sheet.

On the other hand, some nuts when seated within the aperture are flush with both the upper and lower surfaces of the sheet or support plate in which the nut is seated, such as for example fasteners (mounted-nuts) of the Southco Inc. company as typical of such prior art. The upper edge of some of this particular company's fasteners include the above-discussed hexagonal shape, while others have the generally circular shape but with serrated circumscribing portions. Likewise, the Penn Engineering and Manufacturing Corp. carries both of these types of nuts as fasteners for use in thin panels. U.S. Pat. No. 3,399,705 shows a scolloped wall and downwardly-flanged lip.

OBJECTS OF THE INVENTION

Accordingly, objects of the present invention include the overcoming or avoiding of problems, difficulties and short comings of the above-noted prior art, by obtaining a novel article of a mounting plate or sheet carrying a nut welded within the sheet aperture having improved characteristics.

More particularly, an object is to obtain such an article in which the nut, as compared to prior art, has greater resistance to each and both extraction and twisting (revolving) during excessive extraction and/or torque forces subjected thereon during its conventional commercial use.

Another object is to obtain such benefits while confining the nut in its compacted state, to be located within the thickness of very thin sheets or mounting plates, typically of metal.

One or more objects of the invention are obtained by the novel pressing machine, and method of the above-noted parent application, to produce the novel article of this invention. Such are typically represented by the Figures of this application intended to improve understanding but not to unduly limit the invention which includes variations beyond the mere preferred embodiments illustrated.

BROAD DESCRIPTION

Broadly the novel article is a nut welded into an aperture of a mounting plate, herein more often referred to as a sheet. The novel aspects and resulting improved durability and stability against extraction and against revolving responsive to excessive extraction and/or torque forces, results from particular characteristics of the initial nut as well as the nut in its mounted-state, relative to other particular comparative characteristics of the plate and its aperture into which the nut has been compacted to form the plate-nut article. In particular, broadly speaking, a nut used in the production of the article is of an under-cut variety, thus the nut having a larger top end in its diameter than lower portions extending axially thereof toward its bottom end, and concurrently the diameter of the sheet's (plate's) aperture (normally round) is less than the diameter of the top of the nut, i.e than the diameter of the nut's top, with the result that top edges of the nut overhang the top surface of the sheet adjacent to the aperture in which the nut is inserted. Secondly, the overhanging nut's top edges in the novel article are compacted downwardly into the top or upper surface of the sheet. Concurrently in the novel article, lower portions of the sheet as a result of compaction spaced-away-from the aperture against the lower surface of the sheet, have been moved against and pressure-welded to malleable matter of the circumscribing side wall of the inserted nut, it being noted that the article so described has not necessarily had the bottom face of the nut contacted by any press nor compacted upwardly. As a result of all of the above-noted features, the novel objects of the invention are achieved.

In a preferred embodiment, at spaced-apart points along the edge of the compacted nut's top, edge portions of the nut's top and associated adjacent sheet-portions have been more densely compacted with a resulting shifting-radially-outwardly of the more densely-compressed malleable matters of both the nut and the sheet, such that at these points of more dense compression the diameter of the nut's top is greater than the other remaining portions of the nut's top in the compacted state of the article. It is believed that this feature gives preferred locking against potential revolving of the nut responsive to excessively large magnitudes of torque forces. In effect, the nut is thus-locked against potential rotation.

As a result of the above-described features, another preferred feature is obtainable concurrently, namely in use of a thin metal plate or sheet, a short nut may be mounted, as to result in a preferred article in which the top of the compacted nut does not extend above the upper surface of the sheet and the bottom of the compacted nut does not extend above the lower surface of the sheet. This is to say, the overhanging edge of the nut and remaining portions thereof have been compacted into the sheets upper surface and the aperture thereof, at-least to (i.e., downwardly-to) a level of the plane of the sheet's upper surface; and concurrently, because of the unique locking characteristics already described-above, the nut's axial length may be sufficiently short as to extend through the aperture channel at least less than beyond the sheet's lower surface. Accordingly, the article has the welded and compacted nut within the confines of the thickness of the possibly very thin sheet, while concurrently retaining the achieved benefits described-above, of the improved resistance to each and both extraction and twisting relative to the sheet's aperture in which it is compaction-mounted. Such has not been possible by prior art technology and articles thereof, particularly for very thin metal sheets, much less at the low production cost associated with the present article.

The welding of the sheet's malleable matter adjacent the sheet's lower face is the result of heat of compression, which may for convenience be referred to as a pressure-fusion or a pressure-weld, which using the method of the above-noted parent application results from pressing of the lower-sheet matter against the circumscribing side wall of the inserted nut, whereby the sheet matter is densely compacted adjacent the aperture, toward that nut-side wall; such movement is made possible by routine press pressures, as a result of concurrent pressing of the sheet from above, particularly in the preferred embodiment in which spaced-apart portions of the top-surface are more densely compressed.

The pressure fusion is achieved by the parent application method of compressing the sheet and inserted nut between opposing spaced-apart pressing surfaces, at least one and preferably both having separate raised-portions thereon and both preferably and typically of columnar shape, the bottom one being of annular shape preferably. These raised portions are positioned such that contact thereof with the nut's upper surface and upper surface of the plate by the upper press surface, and with the sheets lower surface spaced-away from but in juxtaposition to the aperture, substantially circumscribe the aperture of the sheet into which the nut is compressed to form the inventive article. The raised portions are normally in an array or arrangement of substantially a circle, the bottom press surface's raised portion being preferably a ridge, whereby the resulting article has a groove pressed into the bottom face or surface of the sheet spaced-away from the aperture, as a circular groove. The concurrent or simultaneous compacting forces between the upper and lower press surfaces and raised portions thereof, cause malleable material, preferably metal, to be pressed-downwardly into a receded portion of the nut's circumscribing outer-wall, in addition to the other above-described characteristics of the completed article. The crowded malleable matter and material is so densely compressed as to cause even a bulging within the sheet's lower surface adjacent the nut's outer circumscribing wall side.

The preferred article is a product of a substantially circularly-shaped nut and nut-top, and of a sheet having an aperture of substantially circular configuration, such being the low cost approaches in the technology, and accordingly the invention being directed thereto and having its significance with regard thereto.

The disclosure of the parent application above-noted, is incorporated by reference hereinto this disclosure.

The invention may be better understood by making reference to the following Figures.

Figures 4, 5:
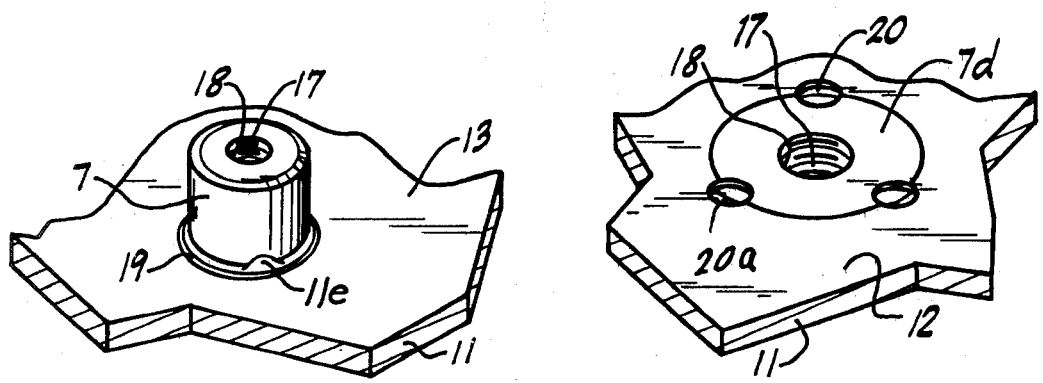

In reference to mounting the nut within the thickness of the thin plate, the meaning of such also naturally refers to the fact of mounting the attaching part within that thickness; i.e., the welding and locking of the nut with the plate is accomplished within that thickness. The fact that the body of the nut may extend beyond, as in the following FIG. 4 is illustrated, does not alter the fact that it is mounted in this case, within the thickness of the sheet.

THE FIGURES

Figure 2:
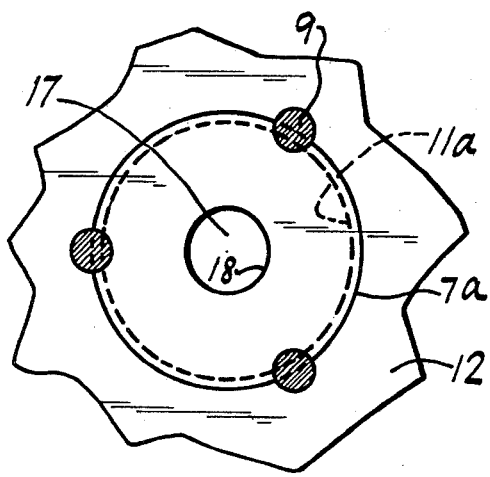
Figure 3:
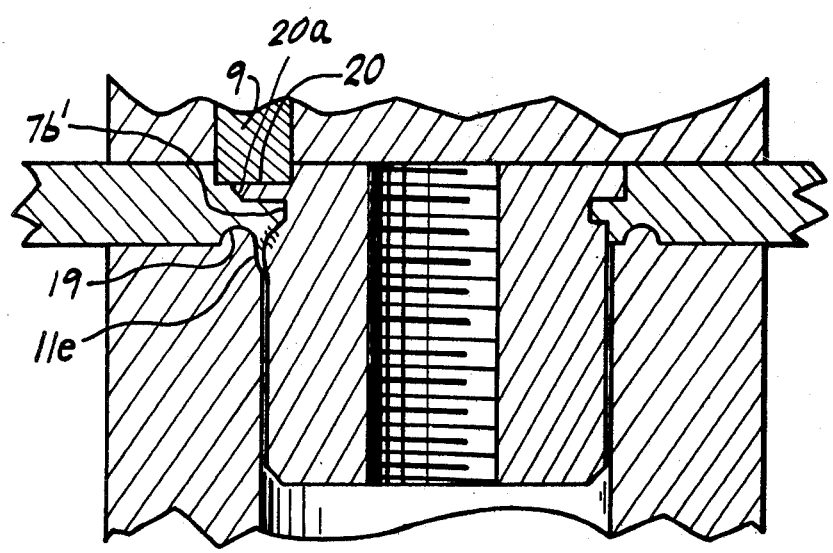

FIGS. 1 through 3 typically illustrate the method, the machine and the article of the invention.

FIGS. 3 through 6 typically illustrate the resulting novel pressure-fused welded article and the use thereof for mounting other objects.

Figure 6:
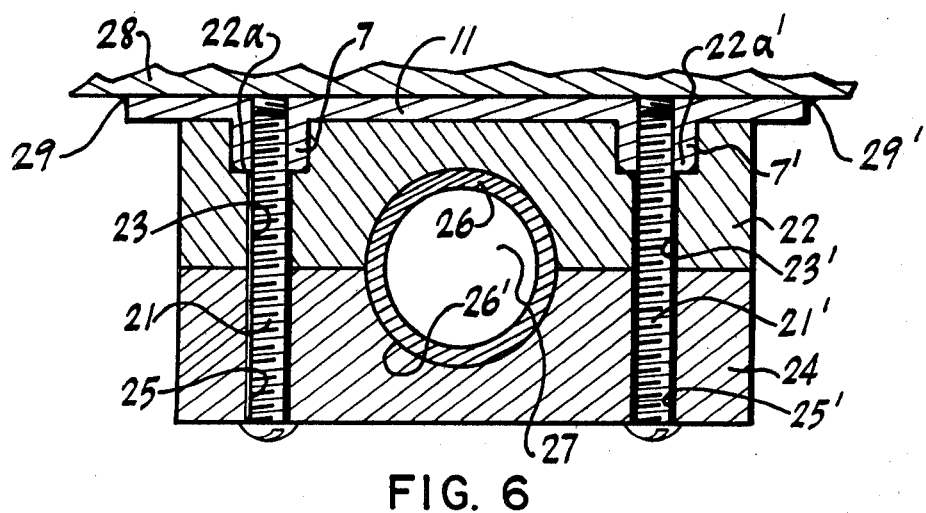

More particularly, FIGS. 1 through 3 illustrate a common embodiment, as well as the FIGS. 4 through 6 still also representing a common embodiment in so far as the same original elements being involved to the extent illustrated in earlier Figures.

FIG. 1 shows a nut 7 mounted within an aperture 11a of a supporting sheet or plate 11 beneath a press 8 having press nipples or tits 9 and with the nut 7 mounted above the press 14 having annular ridge 15. Thus, the nipples 9 are the raised portions on and relative to the upper press 8, and the annular ridge 15 is a continuous raised portion on the lower press 14. There are shown a plurality of the nipples 9, and it is within the contemplated scope of the invention to utilize one or more of separate spaced-apart raised portions other than a continuous ridge, on the lower press 14. Preferably there are utilized a plurality of the nipples 9, which also may be joined as a continuous annular raised portion (downwardly-directed). While it is within the scope of the invention to utilize alone either the nipples 9 or the lower press's raised portion(s) such as the annular ridge 15, preferred pressure fusion evenly distributed around the circumscribing wall of the nut is achieved by having the upper press's raised portions evenly-spaced around as is typically shown in FIGS. 1 and 2, and likewise to have the lower press's raised portions equally spaced around as is the case in the continuous annular ridge 15. Also, the greater degree and strength of pressure fusion (weld and locking) is achieved as preferred when both upper and lower raised portions are used, as in FIGS. 1 and 3, for the machine, the method of use and the novel article of this invention, mounting the nut within the aperture of supporting sheet 11.

The nut 7 is mounted with the overhanging lip or edge portion 7a, within the aperture 11a, and has a recessed portion 7b (and 7b') as a continuous annular recess along the circumscribing side wall of the nut 7, with the lower wall 7c having a diameter of the nut at that point larger than the diameter at the recess and smaller than the diameter at the overhanging lip 7a. The overhanging lip 7a has a nut diameter greater than the diameter of the aperture 11a.

It may be observed in FIG. 5, the fact of the visible line-of-meeting of the compacted over-hanging edge and the upper surface sheet material at line 20a, also illustrated in FIG. 3; the line as viewed from above, as in FIG. 5, evidences that the further excessive compacting pressure at the point of compaction of the projecting portion (nipple 9) has resulted in a shifting outwardly (radially outwardly relative to the nut and the aperture) of both the nut's compacted overhanging edge matter and matter of the sheet's upper surface at these points of compaction.

The upper press has its lower pressing surface 10 beyond which extend the nipples such that during pressing the nipples make contact with the nut's upper surface 7d before eventual contact by the surface 10 after the nipples 9 have been pressed into the surface 12 of the sheet 11.

The lower press 14 has a space 16 which is of spaceous dimensions allowing the nut 7 to be seated therein, during the pressing operation.

The nut 7, as with conventional nuts, has female threaded wall 18 forming through-space 17.

As is graphically represented, the upper press 8 and the lower press 14 are movable to and fro (upwardly and downwardly) toward and away from alternately the other one, so as to press the nut 7 into its fused-position and state as illustrated in FIG. 3. The FIG. 1 thus merely graphically represents the conventional and prior-art elements 31a and 31b and the motor mechanism 30 operatively connected to support and move the presses 8 and 14 as above described.

FIG. 2 illustrates a preferred positioning of the nipple(s) 9 in a position partially overlapping the outer nut edge 7a such that when pressed downwardly forcefully in contact, a portion of the nipple 9 will eventually come into contact with the sheet surface 12, with the result that at that moment it will be pressing the nipple(s) into and below surface 12 thus concurrently compressing sheet matter and the matter of the lip 7a which as shown in FIG. 3 becomes also compressed into the sheet 11, thereby large quantities of the metal of the sheet being malleably pressed into the recess 7b (and 7b') and downwardly toward the sheet surfaces 11a and 13 and downwardly toward the circumscribing wall 7c of the nut; concurrently the annular ridge 15 is pressing into the surface 13 to also compress malleable metal of the sheet 11 toward the surface 12, and 13 of the sheet and surface 7c of the nut. The result of this compression concurrently by each of the nipple(s) and the annular ridge 15 is to bring about a fusion as illustrated in FIG. 3, a weld, with a typically protruding (extruded, in effect) portion 11e located at a position aligned with the position of the nipple(s) 9. The fusion (pressure fusion-weld) is a metal weld by which the nut is mechanically fused and locked to the sheet 11. The protruding portion 11e may be seen as illustrated in each of FIGS. 3 and 4.

While the pressure fusion is typically illustrated in the FIG. 3, there may often be additional areas of pressure fusion other than that merely diagrammatically represented. The point is that definite welding and fusion of metals does take place such that there is no longer a two-piece situation, but a unitary single fusion-joined piece in which the nut is integral with the metal of the sheet. Efforts to wring the nut from its welded state and plate or sheet by an article screw-mounted therein, resulted in merely wringing-off the screw or bolt, in an actual trial. The welded nut would not turn nor twist in its seat, and could not be pulled from its seat. Such is not the case with the prior art mounted nuts, which prior art nuts also, as previously noted, require scolloping or serrating of the nut circumscribing wall, or employing irregularly shaped nuts such as hexagonal, to prevent the turning of the nut in its prior art seated state. And prior art mounted nuts can be pulled from their seats under the same circumstances withstood by the present invention.

As noted above for FIGS. 3 through 6, the FIG. 6 typically illustrates the article of the present invention, in the FIG. 6 it being illustrated in use in a cross-sectional view in which bolts(screws) 25 and 25' anchor pipe-support members 22 and 24 around pipe 26, with the screws 25 and 25' screwed into the female apertures of the mounted-nuts 7 and 7' respectively.

I claim:

1. An article comprising: a sheet having an aperture-forming wall-portion forming a through-channel, an undercut nut having a female threaded bore extending axially therethrough, the nut being welded into the through-channel, of which the undercut nut has a shaft with shaft upper and lower circumscribing side walls, has a circular top having a uniform diameter greater than an upper-end of the through-channel in which the undercut nut is mounted, and has a resulting circular overhanging-edge of said uniform diameter compacted into an upper surface of said aperture-forming wall-portion of said sheet, said overhanging edge of said uniform diameter in its compacted state having spaced-apart points thereof of greater nut-top diameter than of the nut overhanging edge before compaction thereby locking said nut against rotary movement when subjected to torque forces of large magnitude exerted on the nut, said upper surface at said spaced-apart points being indented in its compacted-state to a level below remaining other portions of said upper surface, the undercut nut having a length greater than a thickness of said sheet and having said shaft upper circumscribing side wall undercut within a thickness of said sheet at an upper-shaft location, said shaft being undercut to a lesser shaft-diameter than a lower diameter of the shaft circumscribing wall, and lower portions of the wall-portion of said sheet being compacted upwardly and laterally into a welded-contact with the shaft circumscribing side wall, said lower portion being indented.

2. An article of claim 1, in which said overhanging edge and remaining portions of a top end of said nut are compacted into said upper surface and said aperture at-least to a level of said upper surface.

3. An article of claim 2, in which the nut in its welded and compacted state, has the nut's top at a level at least even with the sheet's upper surface and the nut's bottom at a level at least below the sheet's lower surface.

4. An article of claim 3, in which each of said sheet and said nut comprise malleable metal.

5. An article of claim 1, in which said overhanging edge and remaining portions of a top end of said nut are compacted into said upper surface and said aperture at-least to a level of said upper surface.

* * * * *